United States Patent
Syafril et al.

(10) Patent No.: US 12,105,854 B2
(45) Date of Patent: Oct. 1, 2024

(54) DATA INTERMEDIARY SYSTEM AND DATA INTERMEDIARY METHOD

(71) Applicant: Hitachi, Ltd., Tokyo (JP)

(72) Inventors: Bandara Syafril, Tokyo (JP); Mitsuhiro Kitani, Tokyo (JP); Satoshi Iimuro, Tokyo (JP)

(73) Assignee: HITACHI, LTD.

( * ) Notice: Subject to any disclaimer, the term of this patent is extended or adjusted under 35 U.S.C. 154(b) by 360 days.

(21) Appl. No.: 17/574,799

(22) Filed: Jan. 13, 2022

(65) Prior Publication Data

US 2022/0292215 A1    Sep. 15, 2022

(30) Foreign Application Priority Data

Mar. 12, 2021    (JP) ................. 2021-039944

(51) Int. Cl.
*G06F 21/64* (2013.01)
*G06F 21/62* (2013.01)

(52) U.S. Cl.
CPC ........ *G06F 21/645* (2013.01); *G06F 21/6245* (2013.01); *G06F 21/6272* (2013.01)

(58) Field of Classification Search
None
See application file for complete search history.

(56) References Cited

U.S. PATENT DOCUMENTS

| | | | |
|---|---|---|---|
| 10,133,508 B1* | 11/2018 | Smaldone | G06F 11/1461 |
| 2001/0044786 A1* | 11/2001 | Ishibashi | G06Q 40/12 |
| | | | 713/169 |
| 2001/0054007 A1* | 12/2001 | Minakawa | G06F 21/6245 |
| | | | 705/26.1 |
| 2005/0122973 A1* | 6/2005 | Kim | H04L 41/0896 |
| | | | 370/389 |
| 2009/0300161 A1* | 12/2009 | Pruitt | H04L 12/6418 |
| | | | 709/224 |

FOREIGN PATENT DOCUMENTS

| | | |
|---|---|---|
| JP | 2000-123036 A | 4/2000 |
| JP | 2018-128913 A | 8/2018 |
| WO | 2010/087748 A1 | 8/2010 |

OTHER PUBLICATIONS

Extended European Search Report dated Jun. 28, 2022 for European Patent Application No. 22152586.8.

* cited by examiner

*Primary Examiner* — Bradley W Holder
(74) *Attorney, Agent, or Firm* — Volpe Koenig

(57) ABSTRACT

A data intermediary system includes a processor and a storage unit. The storage unit stores, for a plurality of services used by a user in the past, provision situation information indicating data for each item of the data provided to a service provider to use the service. The processor acquires information indicating an item of data requested, by the service provider, acquires the provision situation of data of the same item as the item of the data requested by the service provider, determines that an item of the data whose provision situation satisfies a predetermined condition is provided to the service provider, and controls distribution of the data to the service provider that that holds the data of the item determined to be provided.

10 Claims, 11 Drawing Sheets

FIG. 7

| ID 701 | ITEM NAME 702 | USE PURPOSE 703 | USE CONDITION 704 | STORAGE PERIOD 705 | INVOLVEMENT CONDITION 706 | PROVISION RATE 707 |
|---|---|---|---|---|---|---|
| D01 | NAME | USER IDENTIFICATION | NO PROVISION TO THIRD PARTY | UNTIL WITHDRAW | DISCLOSURE | 95% |
| D02 | MAIL ADDRESS | USER IDENTIFICATION | NO PROVISION TO THIRD PARTY | UNTIL WITHDRAW | DISCLOSURE, CORRECTION | 90% |
| ... | | | | | | |
| D10 | POSITION INFORMATION | SERVICE OPTIMIZATION | ANONYMIZATION | TIME OF ENDING APPLICATIONA | DISCLOSURE, WITHDRAWAL OF CONSENT | 80% |
| D11 | VISIT HISTORY INFORMATION | SERVICE OPTIMIZATION | ANONYMIZATION | TIME OF ENDING APPLICATIONA | DISCLOSURE, WITHDRAWAL OF CONSENT | 60% |
| D12 | WORD-OF-MOUTH INFORMATION | SERVICE OPTIMIZATION | ANONYMIZATION | TIME OF ENDING APPLICATIONA | DISCLOSURE, WITHDRAWAL OF CONSENT | 0% |

| SERVICE NAME | GOURMET INTRODUCTION SERVICE |

PROPOSE FOLLOWING AGREEMENT CONTENTS FROM PAST PROVISION SITUATION OF CUSTOMER

- [✓] NAME
- [✓] MAIL ADDRESS

. . .

- [✓] VISIT HISTORY INFORMATION
- [ ] WORD-OF-MOUTH INFORMATION

[ CONSENT ]   [ DISSENT ]

PLEASE SEE BELOW FOR DETAILS OF TERMS OF SERVICE.

| ID | SERVICE LEVEL | CONTENT | ESSENTIAL DATA |
|---|---|---|---|
| SL1 | Basic | DISPLAY RECOMMENDED GOURMET ON MAP | NAME<br>MAIL ADDRESS<br>POSITION INFORMATION |
| SL2 | Standard | INDIVIDUALIZATION BASED ON VISIT HISTORY | NAME<br>MAIL ADDRESS<br>POSITION INFORMATION<br>VISIT HISTORY INFORMATION<br>... |
| SL3 | Premium | INDIVIDUALIZATION BASED ON WORD-OF-MOUTH | NAME<br>MAIL ADDRESS<br>POSITION INFORMATION<br>VISIT HISTORY INFORMATION<br>WORD-OF-MOUTH INFORMATION<br>... |

FIG. 11

| SERVICE NAME | GOURMET INTRODUCTION SERVICE |

PROPOSE FOLLOWING AGREEMENT CONTENTS FROM
PAST PROVISION SITUATION OF CUSTOMER

☑ NAME  ☑ MAIL ADDRESS

...

☑ VISIT HISTORY INFORMATION  ☐ WORD-OF-MOUTH INFORMATION

SERVICE LEVEL

☐ Basic  ☑ Standard  ☐ Premium

CONSENT  DISSENT

PLEASE SEE BELOW FOR DETAILS OF TERMS OF SERVICE.

...

DATA INTERMEDIARY SYSTEM AND DATA INTERMEDIARY METHOD

CLAIM OF PRIORITY

The present application claims priority from Japanese patent application JP 2021-039944, filed on Mar. 12, 2021, the content of which is hereby incorporated by reference into this application.

BACKGROUND OF THE INVENTION

1. Field of the Invention

The present invention relates to a data intermediary technique.

2. Description of the Related Art

In data distribution, it is necessary to distribute data based on a rule for data use agreed between a data owner and a data user. For example, JP-A-2018-128913 discloses a technique as a technique for disclosing data to the data user based on a condition designated by the data owner. In JP-A-2018-128913, the data owner degrades data for a purpose of preventing leakage of a know-how or protecting privacy, determines a disclosure condition, and registers the data in an intermediary system. The data user searches for necessary data in the intermediary system, and requests disclosure of the data. The data owner and the data user agree on a consideration and the rule for data use, and control quality of the data based on the agreement.

However, JP-A-2018-128913 has a problem that it takes time and effort to create the rule for the data use between the data owner and the data user since the data owner needs to determine a degradation condition and the disclosure condition by himself/herself, and then perform many exchanges with the data user until the data user agrees on the rule for the data use. In particular, data relating to the privacy cannot be distributed unless the data owner and the data user agree with each other, and a service that the data owner wants to use cannot be received.

SUMMARY OF THE INVENTION

In order to solve the above problem, a data intermediary device according to the invention includes a processor and a storage unit. The storage unit is configured to store, for a plurality of services used by a user in the past, provision situation information indicating a provision situation of data for each item of the data provided to a provider that provides the service in order to use the service. The processor is configured to acquire information indicating an item of data requested, by the provider that provides a service requested to be used by the user, to be provided by the user, acquire the provision situation of data of the same item as the item of the data requested, by the provider that provides the requested service, to be provided by the user, determine that an item of the data whose provision situation satisfies a predetermined condition is provided to the provider that provides the requested service, and control distribution of the data to the provider that provides the requested service from a provider that holds the data of the item determined to be provided.

According to the invention, it is possible to extract a provision situation of personal data of a user that is a data owner, and to grasp privacy preference of the user such as which data is provided and which data is not provided by individual users. As a result, the user can quickly receive the service to be used. Objects, configurations, and effects other than those described above will be clarified by following embodiments.

BRIEF DESCRIPTION OF THE DRAWINGS

FIG. 7 is an explanatory diagram showing an example of a table in which the provision situation of data is stored by the data intermediary device according to the first embodiment of the invention.

FIG. 8 is an explanatory diagram showing an example of a screen displayed when disclosure consent of a user is requested by the data intermediary device according to the first embodiment of the invention.

FIG. 10 is an explanatory diagram showing an example of service levels according to the second embodiment of the invention.

FIG. 11 is an explanatory diagram showing an example of a consent request screen that employs the service levels and is displayed by the data intermediary device according to the second embodiment of the invention.

DESCRIPTION OF THE PREFERRED EMBODIMENTS

Figure 1:
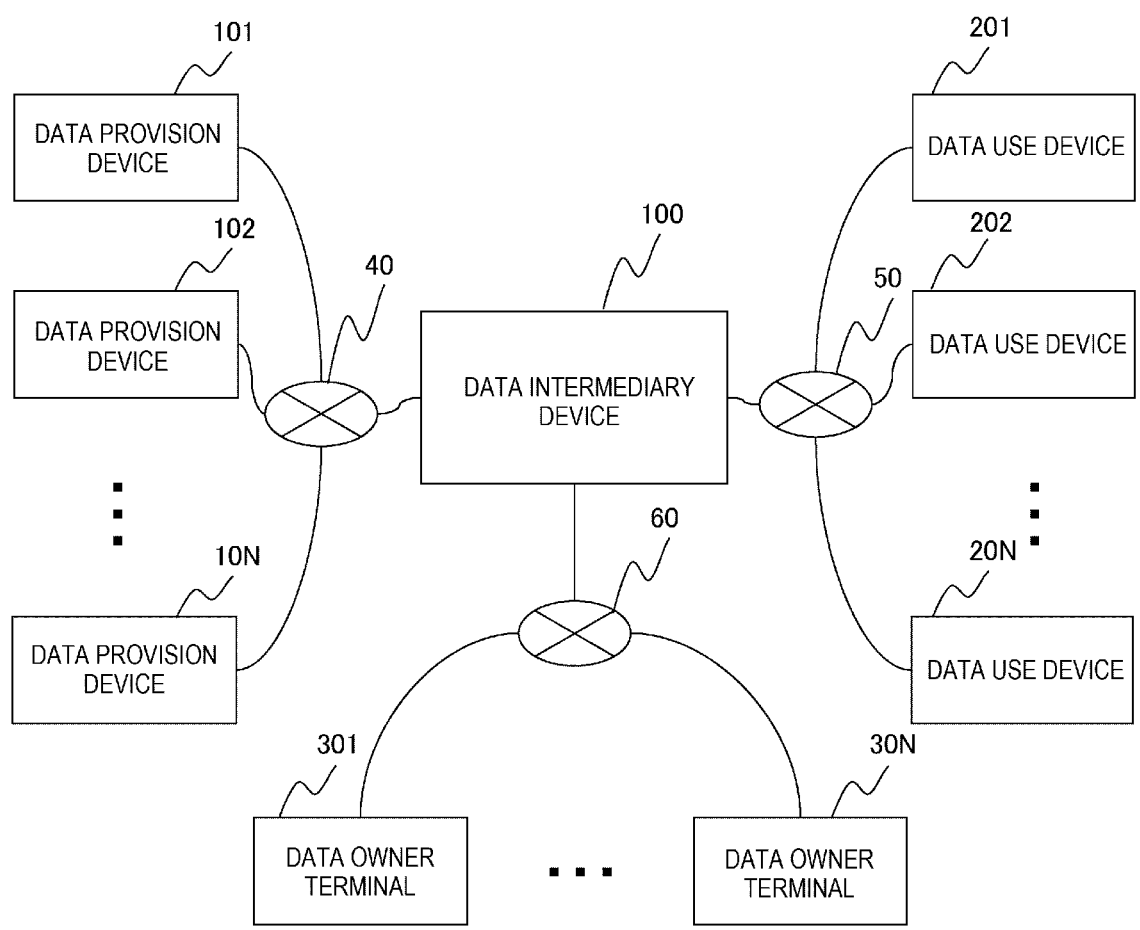
FIG. 1 shows an example of a configuration of a data distribution system according to a first embodiment of the invention.

Hereinafter, embodiments of the invention will be described with reference to the drawings. In all the drawings, same configurations and steps are denoted by same reference numerals, and redundant description thereof will be omitted.

First Embodiment

FIG. 1: Configuration of Data Distribution System

FIG. 1 shows an example of a configuration of a data distribution system according to a first embodiment of the invention.

In FIG. 1, the data distribution system includes data provision devices 101, 102, . . . , 10N (N is an integer satisfying N>0), a data intermediary device 100, data use devices 201, 202, . . . , 20N, and data owner terminals 301, . . . , 30N. The data intermediary device 100 is connected to a communication network 40. The data provision devices 101, 102, . . . , 10N are connected to the communication network 40. The data intermediary device 100 is connected to a communication network 50. The data use devices 201, 202, . . . , 20N are connected to the communication network 50. Furthermore, the data intermediary device 100 is also connected to a communication network 60. The data owner terminals 301, . . . , 30N are connected to the communication network 60.

The communication network 40, the communication network 50, and the communication network 60 may be the same network.

The data provision device 10N is a device used by a service provider that is providing a service to a user. When the user uses the service, personal data related to the user is stored in the data provision device 10N. Hereinafter, any data provision device among the data provision devices 101, 102, . . . , 10N will be referred to as the data provision device 10N.

The data use device 20N is a device used by the provider that provides a service to the user, and requires the personal data of the user stored in the data provision device 10N in order to provide the service. Hereinafter, any data use device among the data use devices 201, 202, . . . , 20N will be referred to as the data use device 20N.

The data owner terminal 30N is used to set whether a user who owns the personal data stored in the data provision device 10N may desire to use the service provided by the data use device 20N and provide the personal data of the user to the data use device 20N, and is used for the use of the service. Hereinafter, any data owner terminal among the data owner terminals 301, . . . , 30N will be referred to as the data owner terminal 30N.

The number of the data provision devices 10N, the number of the data use devices 20N, and the number of the data owner terminals 30N that constitute the data distribution system are any, and may not be the same.

The data owner terminal 30N according to the present embodiment may be implemented by a dedicated hardware, or may be configured by a central processing unit (CPU), a memory, and the like, and may implement a function thereof by the CPU executing a computer program for implementing functions of units. For example, the data owner terminal 30N may be a mobile communication terminal device such as a smartphone or a smart device of car navigation of an automobile, or may be a stationary communication terminal (for example, a personal computer).

Figure 2A:
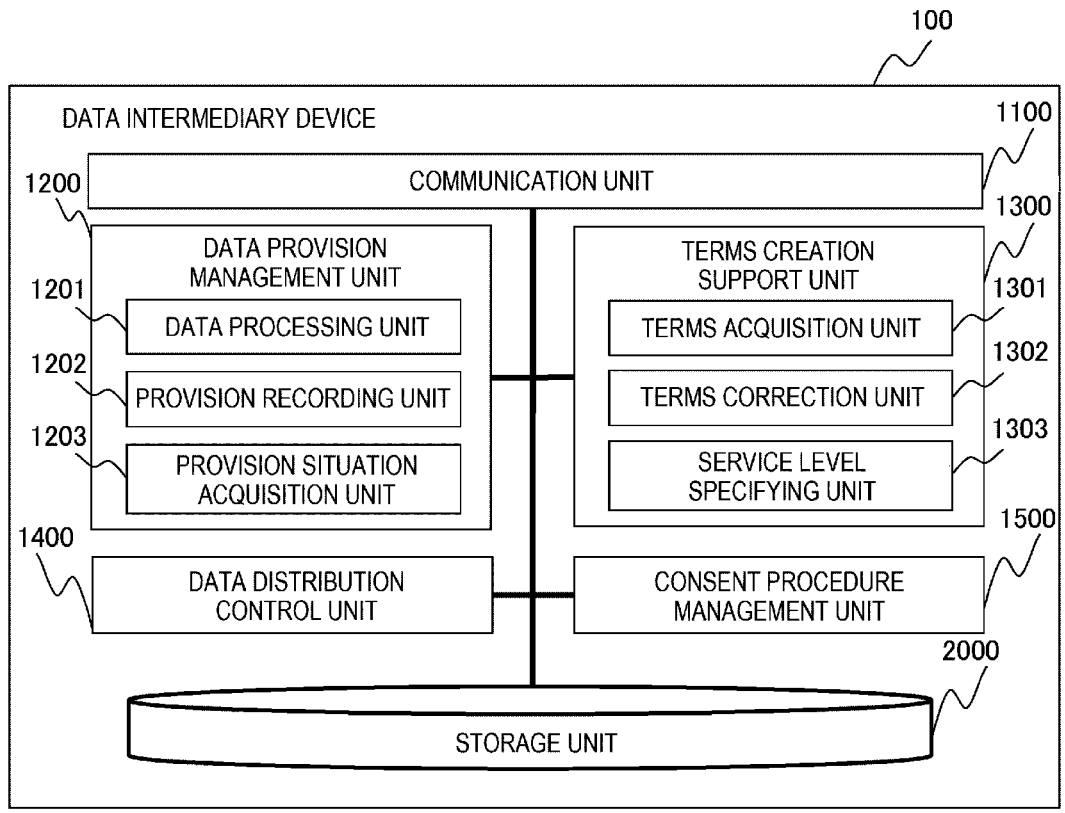
FIG. 2A is a block diagram showing an example of a configuration of a data intermediary device according to the first embodiment of the invention.
Figure 2B:
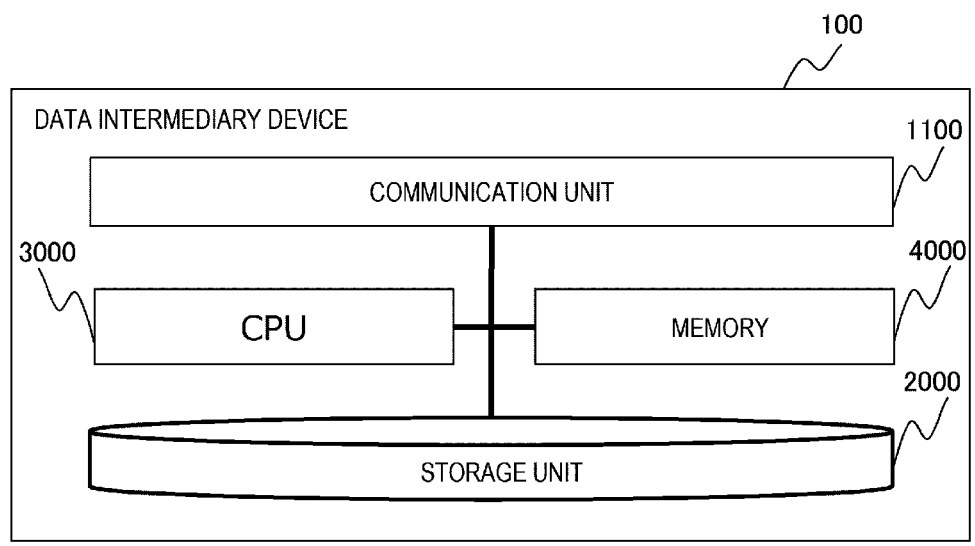
FIG. 2B is a block diagram showing an example of a hardware configuration of the data intermediary device according to the first embodiment of the invention.

FIGS. 2A and 2B: Configuration of Data Intermediary Device 100

FIG. 2A is a block diagram showing an example of a configuration of the data intermediary device 100 according to the first embodiment of the invention.

The data intermediary device 100 includes a communication unit 1100, a data provision management unit 1200, a terms creation support unit 1300, a data distribution control unit 1400, a consent procedure management unit 1500, and a storage unit 2000.

The communication unit 1100 communicates with the data provision device 10N via the communication network 40, communicates with the data use device 20N via the communication network 50, and communicates with the data owner terminal 30N via the communication network 60. For example, the communication unit 1100 receives terms of service that the user wants to use from the data use device 20N, and transfers the terms to a terms acquisition unit 1301. The communication unit 1100 transmits terms corrected by a terms correction unit 1302 to the data owner terminal 30N, and requests consent to the terms. The communication unit 1100 receives a consent result from the data owner terminal 30N. The consent procedure management unit 1500 records the consent result.

The data provision management unit 1200 includes a data processing unit 1201, a provision recording unit 1202, and a provision situation acquisition unit 1203.

The data processing unit 1201 performs processing necessary to provide data provided from the data provision device 10N to the data use device 20N when the user uses the service provided by the data use device 20N. For example, the data processing unit 1201 deletes an unnecessary data item or performs anonymization processing.

The provision recording unit 1202 records the data provided from the data provision device 10N to the data use device 20N when the user uses the service provided by the data use device 20N. For example, the provision recording unit 1202 provides movement history data of the user stored by the data provision device 10N to the data use device 20N in order to use a service. At this time, the provision recording unit 1202 records a time stamp, a data type, a data content, a provided service name, and a provided service provider name in the provision of the movement history data. However, a recording format is not limited to this.

The provision situation acquisition unit 1203 checks a provision situation of specific data from the data of the user recorded by the provision recording unit 1202 and provided from the data provision device 10N to the data use device 20N. The provision situation here refers to, for example, with respect to specific data, a service requesting the data and a service for which the data is actually provided.

The terms creation support unit 1300 includes the terms acquisition unit 1301, the terms correction unit 1302, and a service level specifying unit 1303.

When the user wants to use the service provided by the data use device 20N, the terms acquisition unit 1301 acquires terms agreed between the user and the service provider from the data use device 20N.

The terms correction unit 1302 corrects an item that differ between terms of the service provider that is most trusted by the user and the terms of the service that is provided by the data use device 20N and that the user wants to use, so as to be able to inherit the terms of the service provider that is most trusted by the user.

The service level specifying unit 1303 specifies a level of the service provided to the user based on a data item that determined to be provided by the user for the use of the service. For example, when a service provider provides a service to a user, the highest level of service is provided to the user who provides all data desired to be acquired from the user, whereas a basic level of service is provided to the user who provides only the minimum data.

The data distribution control unit 1400 controls distribution of the personal data of the user stored by the data provision device 10N to the data use device 20N based on terms of service of a service that has been agreed by the user and that is managed by the consent procedure management unit 1500.

The consent procedure management unit 1500 transmits the terms of service of the service that the user wants to use to the data owner terminal 30N by the communication unit 1100, determines whether the user consents to the terms of service by operating the data owner terminal 30N, and records and manages a consent result of the user received by the communication unit 1100.

The storage unit 2000 stores data generated when the communication unit 1100, the data provision management unit 1200, the terms creation support unit 1300, the data distribution control unit 1400, and the consent procedure management unit 1500 implement the functions of the units, and provides necessary data to the units.

The data intermediary device 100 according to the present embodiment may be implemented by a dedicated hardware, may be configured by a CPU, a memory, and the like, and may implement a function thereof by the CPU executing a computer program for implementing the functions of the units. For example, the data intermediary device 100 may be configured by a general-purpose computer such as a personal computer, and may implement the function thereof by a computer executing a computer program for implementing the functions of the units of the data intermediary device 100 displayed in FIG. 2A.

FIG. 2B is a block diagram showing an example of a hardware configuration of the data intermediary device 100 according to the first embodiment of the invention.

The data intermediary device 100 may include the communication unit 1100, a CPU 3000, a memory 4000, and the storage unit 2000. In this case, a computer program for implementing the functions of the data provision management unit 1200, the terms creation support unit 1300, the data distribution control unit 1400, and the consent procedure management unit 1500 is stored in the memory 4000. The above functions are implemented by the CPU 3000 executing the computer program. The above functions of the computer program may be implemented by a single device, or may be implemented by a plurality of devices communicably connected to each other. The data intermediary device may be read as the data intermediary system based on the fact that the above functions can be implemented by the single device or the plurality of devices.

Next, a data intermediary method according to the present embodiment will be described.

Figure 3:
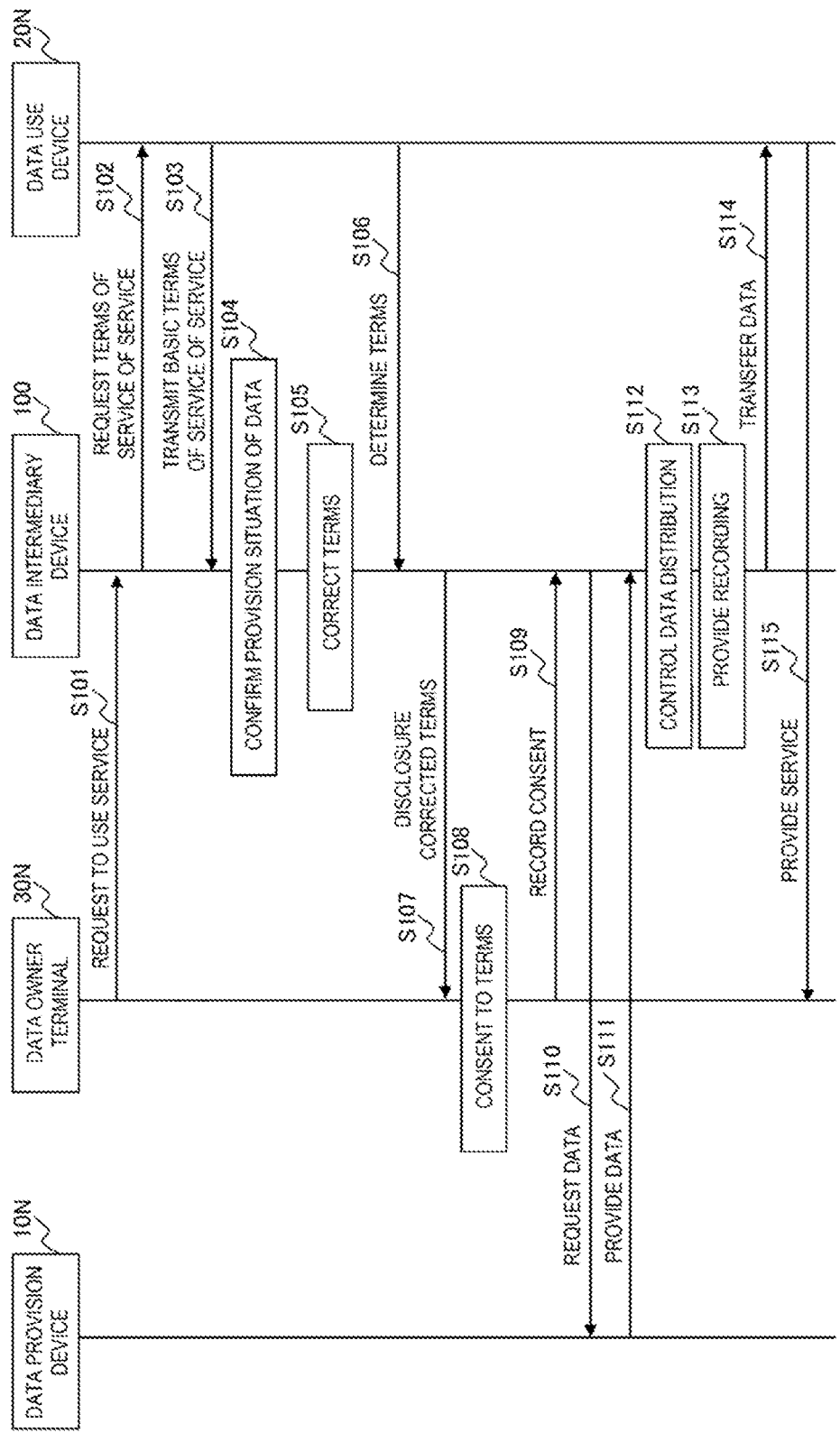
FIG. 3 is a sequence chart showing an example of a data intermediary method according to the first embodiment of the invention.

FIG. 3: Procedure of Service Use

The data intermediary method according to the present embodiment will be described with reference to FIG. 3. FIG. 3 is a sequence chart showing an example of the data intermediary method according to the first embodiment of the invention. Specifically, FIG. 3 shows a procedure from when the user requests the use of the service to when the user uses the service.

In step S101, the data owner terminal 30N transmits a use request of a service provided by the data use device 20N to the data intermediary device 100 in response to a user operation. The use request of the service is a message including a service ID and a user ID. The service ID is information for identifying the service provided by the data use device 20N. The user ID is information for identifying the user. The data intermediary device 100 receives the use request of the service via the communication unit 1100. The data intermediary device 100 stores the received use request of the service.

In step S102, the data intermediary device 100 transmits, via the communication unit 1100, a transmission request of the terms of service of the service in the service ID to the data use device 20N corresponding to the service ID included in the received use request of the service. The data intermediary device 100 stores in advance information that associates the service ID with the data use device 20N. The transmission request of the terms of service of the service is a message including the service ID, and is a message requesting transmission of the terms defined by the service provider. The terms of service of the service are received by the data use device 20N.

In step S103, the data use device 20N transmits the terms of service of the service corresponding to the service ID included in the received transmission request of the terms of service of the service to the data intermediary device 100. Data of the terms of service of the service corresponding to the service ID is data including information representing the terms of service defined by the service provider that provides the service corresponding to the service ID.

The data of the terms received via the communication unit 1100 is managed as a terms of service table by the terms acquisition unit 1301. The terms of service table is stored in the storage unit 2000.

Figure 6:
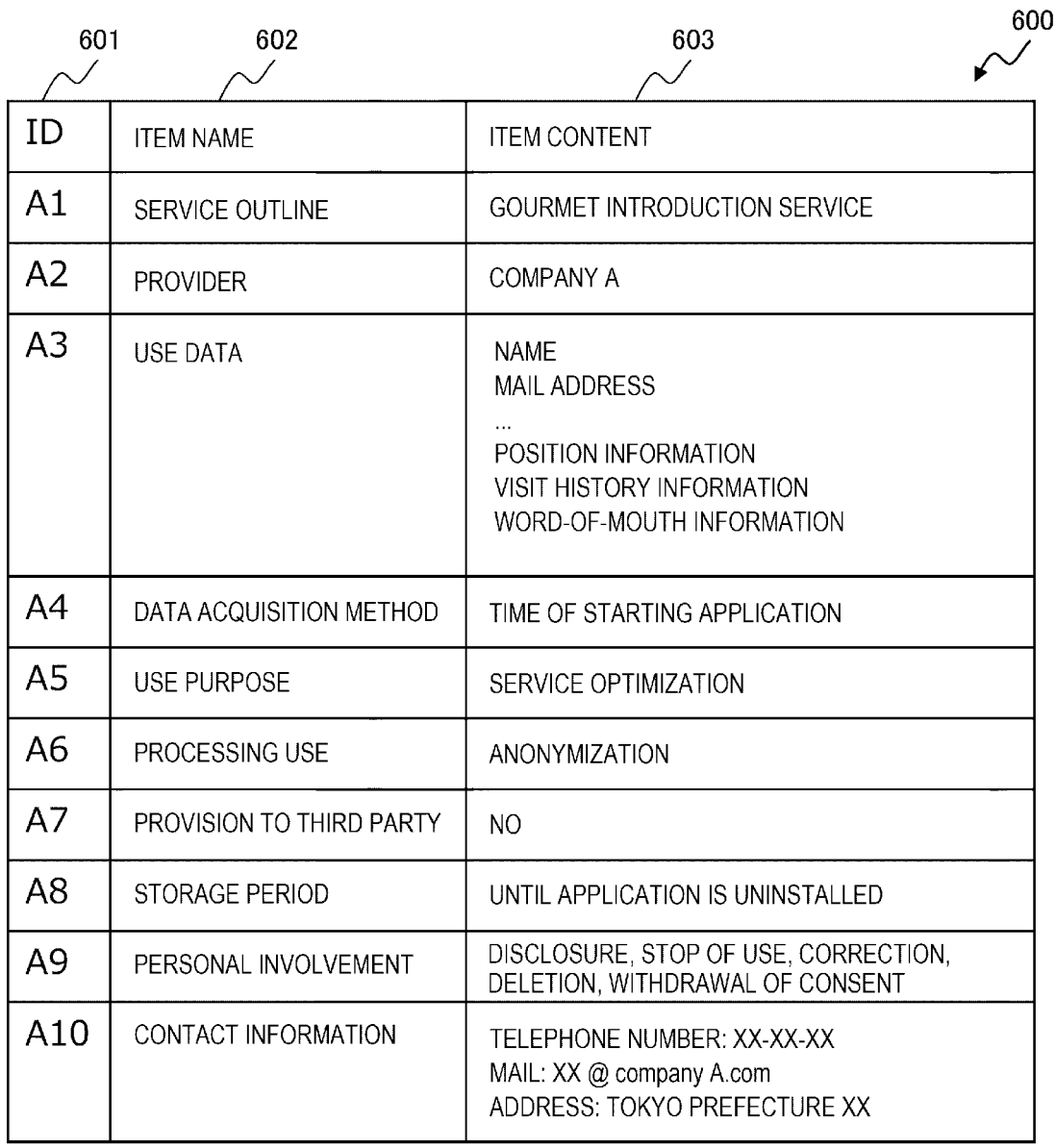
FIG. 6 is an explanatory diagram showing an example of a terms of service table stored by the data intermediary device according to the first embodiment of the invention.

FIG. 6 is an explanatory diagram showing an example of the terms of service table stored by the data intermediary device 100 according to the first embodiment of the present invention.

As shown in FIG. 6, a terms of service table 600 includes an ID 601, an item name 602, and an item content 603. The ID 601 is information for identifying an item of the terms of service. The item name 602 indicates a name of an item. Examples of the item name include a service outline, a provider, use data, a data acquisition method, a use purpose, a processing use, provision to a third party, a storage period, personal involvement, contact information, and the like. The item content 603 describes a terms content for each item in the service.

FIG. 6 shows terms of service related to a "gourmet introduction service" provided by a provider that is a "company A" as an example. According to the terms of service illustrated here, it is necessary for the user to provide information such as a "name", a "mail address", "position information", "visit history information", and "word-of-mouth information" to the provider in order to use the service. The information is acquired at a time of starting an application, is used after performing anonymization for a purpose of optimizing the service, is not provided to a third party (that is, a party other than the "company A"), and is stored until the application is uninstalled. The user himself/herself can be involved in disclosure, stop of use, correction, deletion, and withdrawal of consent of the information.

Word-of-mouth generally means oral communication. However, the word-of-mouth information in the present embodiment is not limited to oral information, and refers to information that is generated by the user and is mainly distributed between the users. A content and a distribution mode of the word-of-mouth information are not limited, and a typical example of the word-of-mouth information is information such as an evaluation or an impression made by the user himself/herself to the service that has been used by the user, and is distributed through a social networking service (SNS), a review site, or the like.

Although FIG. 6 illustrates a case where the table is composed of three columns and eleven rows, the number of columns and the number of rows in the terms of service table 600 are not limited thereto. For example, the information such as the data acquisition method, the use purpose, the processing use, the provision to a third party, the storage period, and the personal involvement may be set for each item such as "name" and "mail address" stored as the "use data".

FIG. 3 is referred to again.

In step S104, the provision situation acquisition unit 1203 retrieves the terms of service of the service from the storage unit 2000, extracts data items necessary to use the service, and confirms provision situation in each of the data items. An example of a method of confirming the provision situation of the data will be described below with reference to FIG. 4.

Figure 4:
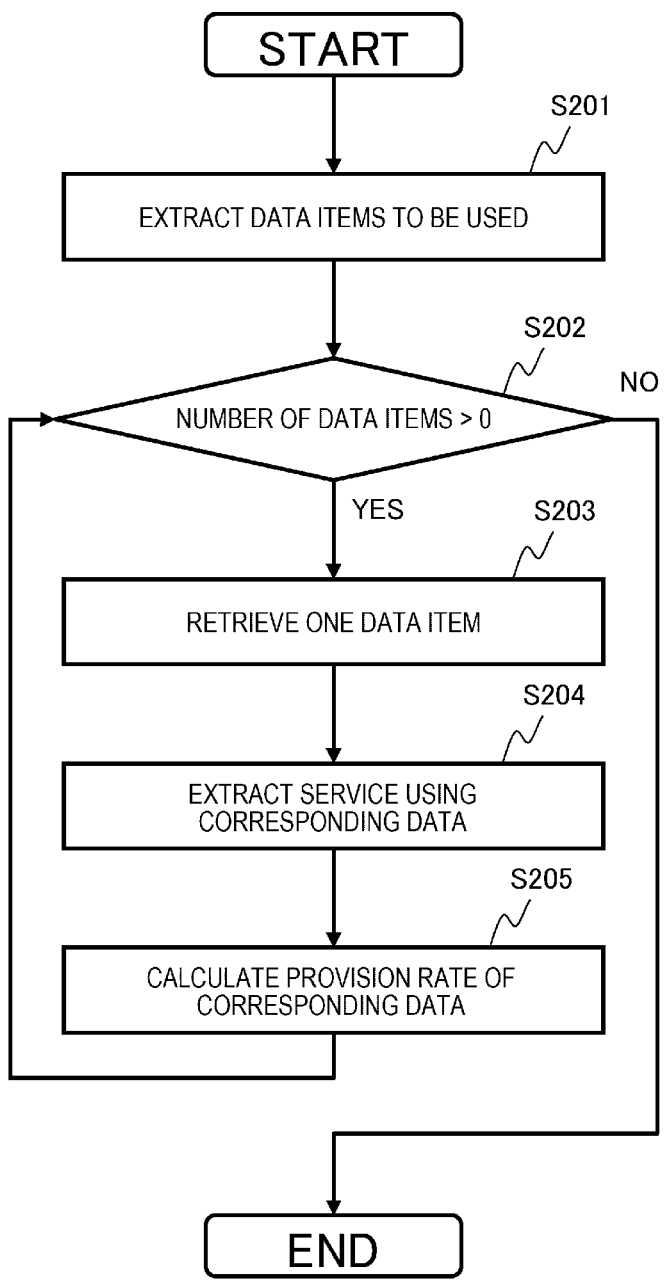
FIG. 4 is a flowchart showing an example of a method of confirming a provision situation of data by the data intermediary device according to the first embodiment of the invention.

FIG. 4: Process of Confirming Provision Situation of Data

FIG. 4 is a flowchart showing an example of the method of confirming the provision situation of the data by the data intermediary device 100 according to the first embodiment of the invention.

In step S201, the provision state acquisition unit 1203 searches for an item called the use data from the terms of service of the service retrieved from the storage unit 2000, and extracts data items necessary to use the service from item content of the use data.

In step S202, the provision situation acquisition unit 1203 confirms the number of the data items necessary to use the service. When the number of the data items is larger than 0, the process proceeds to step S203. When the number of the data items is 0, the confirmation of the data provision situation ends.

In step S203, the provision situation acquisition unit 1203 retrieves one item from the data items necessary to use the service. For example, as shown in FIG. 6, it is assumed that the name, the mail address, . . . , the position information, the visit history information, and the word-of-mouth information are present as the data necessary to use the service. In this step, for example, an item called "name" is retrieved from the items.

In step S204, the provision situation acquisition unit 1203 extracts a service requesting use of the data item extracted in step S203 from among services currently used by the user with reference to provision log information recorded in the provision recording unit 1202. The provision situation acquisition unit 1203 extracts a service for which the data item retrieved in step S203 is provided from among the services currently used by the user with reference to the provision log information recorded by the provision recording unit 1202.

In step S205, the provision situation acquisition unit 1203 calculates a provision rate of the data item using the number of the services extracted in step S204 requesting the data item and the number of the services extracted in step S204 for which the data item is provided. For example, when the number of the services requesting the data is 100 and the number of the services for which the data is provided is 100, the provision rate is 100%. When the number of the services requesting the data is 100 and the number of the services for which the data is provided is 0, the provision rate is 0%.

When the calculation of the provision rate of the data item is completed, the number of the data items is decremented and the process returns to S202. The provision situation acquisition unit 1203 calculates provision rates of data for all the data items by repeating the above process. A calculation result of the provision rate of data is stored in the storage unit 2000.

FIG. 7 is an explanatory diagram showing an example of a table in which a provision situation of data is stored by the data intermediary device 100 according to the first embodiment of the invention.

A data provision situation table 700 includes an ID 701, an item name 702, a use purpose 703, a use condition 704, a storage period 705, an involvement condition 706, and a provision rate 707. The ID 701 is information for identifying a data item. The item name 702 indicates a name of a data item. The use purpose 703 indicates an application in which data is used by the data use device 20N. The use condition 704 indicates a condition when data is used, which is determined by the user. The storage period 705 indicates a period during which data is stored in the data use device 20N. The involvement condition 706 indicates a condition in which the user can be involved in the data use device 20N. The provision rate 707 indicates a degree of provision of a data item.

Some of examples illustrated in FIG. 7 will be described. Among services used in the past by the user, regarding services for which it is necessary to provide the name for use, the user consents to provide the name for 95% of the services under conditions that the data in the name is used for user identification, is not provided to a third party, is stored until the user withdraws, and that the user can be involved in disclosure. In contrast, regarding the word-of-mouth information, the user has never consented to provide the word-of-mouth information under the condition that the word-of-mouth information is used for optimizing the service, is subjected to the anonymization, is stored until the end of the application, and that the user can be involved in the disclosure and the withdrawal of consent.

In the present embodiment, the table composed of seven items from the ID 701 to the provision rate 707 is described as an example, but a format of the data provision situation table 700 is not limited thereto.

FIG. 3 is referred to again.

In step S105, the data intermediary device 100 confirms personal data that can be provided by the user based on the provision situation of the personal data that has been extracted in step S104 and is provided for the use of the service by the user, and corrects the terms of service of the service that the user wants to newly use. An example of a correction method will be described below with reference to FIG. 5.

Figure 5:
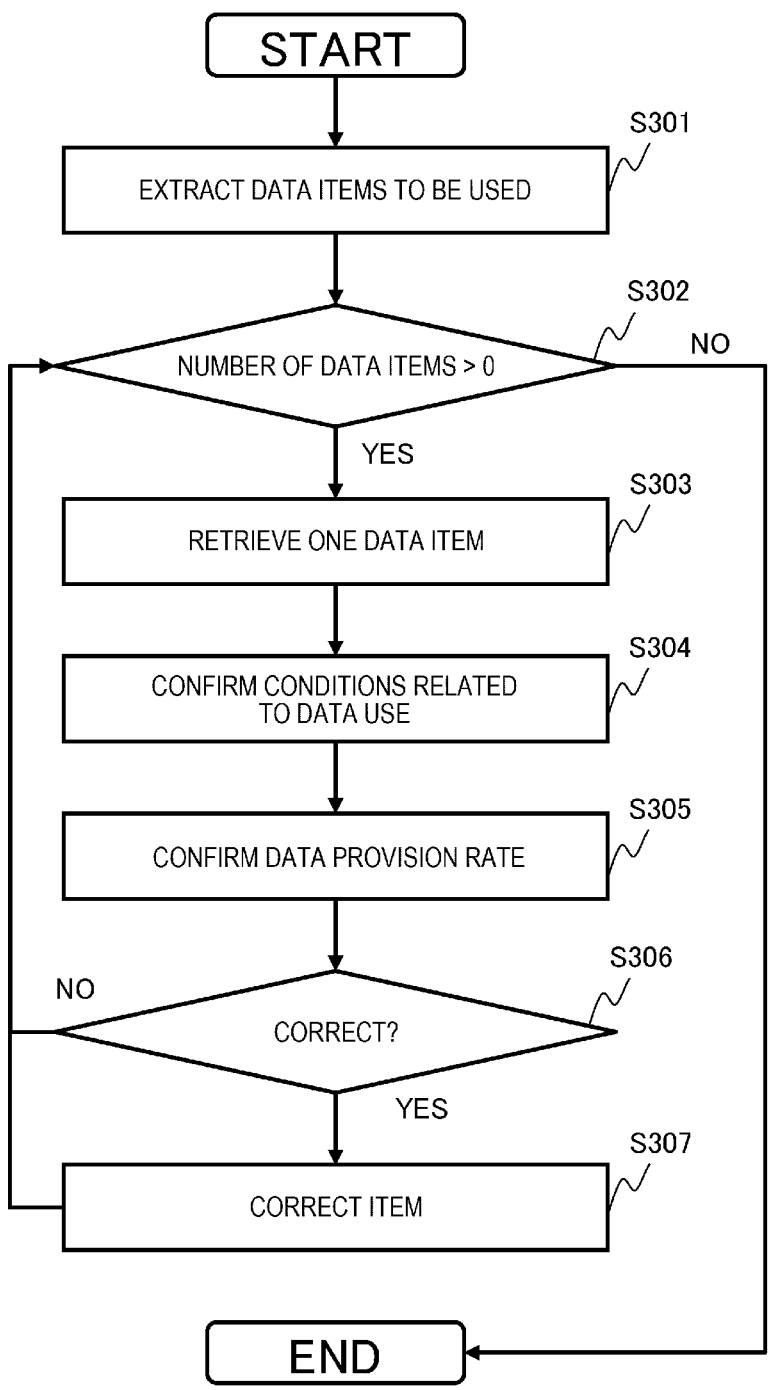
FIG. 5 is a flowchart showing an example of a method of correcting terms of service of a service by the data intermediary device according to the first embodiment of the invention.

FIG. 5: Process of Correcting Terms of Service

FIG. 5 is a flowchart showing the example of the method of correcting the terms of service of the service by the data intermediary device 100 according to the first embodiment of the invention.

In step S301, the terms correction unit 1302 searches for an item called the use data from the terms of service of the service retrieved from the storage unit 2000, and extracts data items necessary to use the service from item content of the use data.

In step S302, the terms correction unit 1302 confirms the number of the data items that is extracted in step S301 and that is necessary for the service that the user wants to newly use. When the number of the data items is larger than 0, the process proceeds to step S303, whereas when the number of the data items is 0, the process of correcting the terms of service ends.

In step S303, the terms correction unit 1302 retrieves one data item from the data items necessary for the service that the user wants to newly use.

In step S304, the terms correction unit 1302 confirms conditions related to the data use by checking the data provision situation extracted in step S104 regarding the data item retrieved in step S303. It is considered that the conditions related to the data use include, for example, the use purpose, the use condition, the storage period, and the involvement condition shown in FIG. 7. The terms correction unit 1302 confirms whether the terms of service of the service are applicable to the service already used by the user. When the terms of service of the service are not applicable, the data item is recorded as a correction item candidate.

In step S305, the terms correction unit 1302 confirms the provision rate of data by checking the data provision situation extracted in step S104 regarding the data item retrieved in step S303. The terms correction unit 1302 determines whether the data item can be provided using the data provision rate and a data provision threshold value determined by the user in advance. For example, when the data provision threshold value determined by the user is 50%, data that has a provision rate of 50% or more is regarded as data that can be provided and is left in the terms of service. A data item that has a provision rate of less than 50% is recorded as a candidate to be corrected from the terms of service.

In step S306, the terms correction unit 1302 confirms whether the correction item candidates recorded in step S304 and step S305 can be corrected. The determination as to whether the correction item candidates can be corrected is transmitted in advance by the provider that provides the service together with the terms of service of the service through the data use device 20N. When the item can be corrected, the process proceeds to step S307, whereas when the item cannot be corrected, the process proceeds to step S302.

In step S307, the terms correction unit 1302 corrects the correction item candidates recorded in step S304 and step S305. For example, when the storage period of the data is not applicable regarding the condition related to the data use, the storage period is corrected to a storage period that the user consents to the provision most frequently.

FIG. 3 is referred to again.

In step S106, the data intermediary device 100 notifies, through the communication unit 1100, the data use device 20N of the terms of service of the service corrected in step S105. The service provider confirms and determines the received terms of service of the service. A message related to the notification and the determination of the terms of service of the service includes the service ID and the user ID.

In step S107, the data intermediary device 100 transmits the terms of service of the service determined by the service provider in step S106 to the data owner terminal 30N via the communication unit 1100, and discloses the terms of service of the service to the user.

FIG. 8 is an explanatory diagram showing an example of a screen displayed when disclosure consent of the user is requested by the data intermediary device 100 according to the first embodiment of the invention.

As shown in FIG. 8, a consent request screen includes a service name, data items necessary to use the service, buttons for making a decision indication as to whether to consent to, and a specific terms of service. However, the consent request screen is not limited to this format.

FIG. 3 is referred to again.

In step S108, the user confirms the consent request screen through the data owner terminal 30N, confirms consent content proposed by the data intermediary device 100 in the service that the user wants to newly use, selects data to be provided, and makes a decision indication as to whether to consent to the terms of service of the service.

In step S109, the consent procedure management unit 1500 of the data intermediary device 100 records and manages which user consents to what terms of service for which service with reference to the terms of service consented by the user in step S108.

In step S110, the data intermediary device 100 requests the data provision device 10N to provide the data necessary for the service that the user wants to newly use, based on the terms of service that has been consented to by the user and that is recorded in step 109. A message requesting data provision includes the user ID for identifying the user, the data items, and information indicating that the user has consented.

In step S111, the data provision device 10N confirms that the user has consented from the request with respect to the data intermediary device 100, searches for the necessary data using the user ID and the data items, and transmits the data to the data intermediary device 100.

In step S112, the data processing unit 1201 of the data intermediary device 100 executes a process necessary to provide the personal data of the user that is necessary for the service to be newly used and that is received in step S111 to the data use device 20N. The data distribution control unit 1400 performs control such that the data can be provided to the correct data use device 20N.

In step S113, the data intermediary device 100 records the data provided to the data use device 20N in step S112. The data recorded here include the time stamp, the user ID, the service ID, and the data items.

In step S114, the data intermediary device 100 actually transfers the data recorded in step S113 to the data use device 20N through the communication unit 1100. A message transferred to the data use device 20N includes the user ID for identifying the user, the service ID for identifying the service, and the data items necessary for the service.

In step S115, the data use device 20N provides the service that the user wants to use via the data owner terminal 30N based on the data of the user received in step S114.

According to the present embodiment, it is possible to extract the provision situation of the personal data of the user that is a data owner, and to grasp privacy preference of the user such as which data is provided and which data is not provided by individual users. As a result, the service provider can create the terms of service of the service in accordance with the individual users. The user can grasp that the preference of the user himself/herself is reflected in the disclosed terms of service of the service, and can quickly determine whether to consent, thereby increasing a consent rate. Since the agreement between the user that owns the data and the data user can be quickly obtained, the user can quickly receive the service that the user wants to use.

Second Embodiment

Next, a second embodiment of the invention will be described. In the second embodiment, a service level is specified in accordance with the data provided by the user in the confirmation of the provision situation of the data in step S104 of the first embodiment.

Details of step S104 in the second embodiment will be described below with reference to FIGS. 9 to 11.

Figure 9:
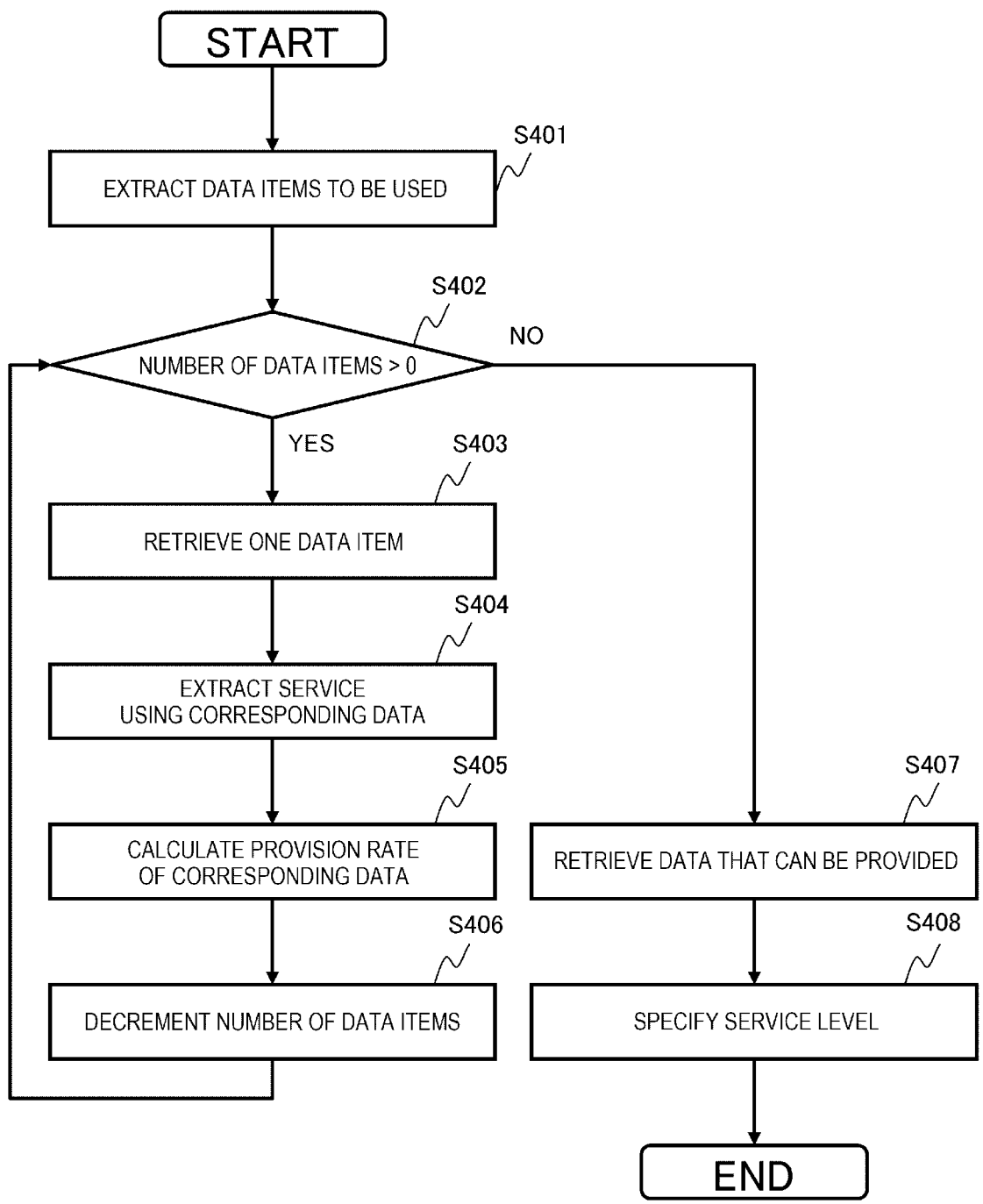
FIG. 9 is a flowchart showing an example of a method of confirming a provision situation of data and specifying a service level provided to a user by a data intermediary device according to a second embodiment of the invention.

FIG. 9 is a flowchart showing an example of a method of confirming the provision situation of the data and specifying a level of the service provided to the user by the data intermediary device 100 according to the second embodiment of the invention.

In a process of FIG. 9, the data intermediary device 100 confirms the provision situation of the data in the service already used by the user, extracts the data that can be provided by the user, and specifies the level of the service provided to the user.

Steps S401 to S406 are the same as steps S201 to S205 in FIG. 4. That is, as described in the first embodiment, the data intermediary device 100 extracts the data items necessary for the service that the user wants to newly use, and confirms a degree of provision in the service used by the user for each of the data items.

When the number of the data items is 0 in step S402, that is, when the process of step S403 to step S405 is completed for all the data items, the process proceeds to step S407.

In step S407, the data intermediary device 100 extracts the data that can be provided for the service to be newly used. As shown in FIG. 7, the data intermediary device 100 confirms the provision situation of the data of the user as a result of the process in which all the steps are performed. As a method of extracting the data that can be provided by the user, it is considered that a data item that has a provision rate equal to or more than a threshold value set by the user in advance is extracted as the data that can be provided with reference to the data provision situation table 700. For example, when the user sets 50% as the threshold value, a data item that has a provision rate of 50% or more in the data provision situation table 700 is extracted as the data that can be provided.

In step S408, the data intermediary device 100 specifies the level of the service provided to the user from the data items that can be provided for the service to be newly used and are extracted in step S407. The service level is a content and a quality of the service provided to the user in accordance with the data that can be provided by the user in the use of the service.

FIG. 10 is an explanatory diagram showing an example of the service levels according to the second embodiment of the invention.

Service level information 1000 shown in FIG. 10 includes an ID 1001 for identifying the service level, a service level 1002 indicating names of the service levels, a content 1003 indicating the content of the service of each level, and essential data 1004 indicating an item of data that needs to be provided to the provider by the user in order to receive the service of each level. Such information on the service levels may be included in the terms of service of the service.

In the example of FIG. 10, three service levels are set for the gourmet introduction service. In a service level "Basic", only the minimum information necessary for the user to use the service is provided, and a service content provided in accordance with the information only displays recommended gourmet information on a map. In a service level "Standard", the user provides more data, and receives a service that is not received at the service level "Basic". For example, it is considered that a service in which the gourmet information introduced on the map is further individualized based on a past visit history is received by providing the visit history information. In a service level "Premium", the user receives a service having the highest quality by providing all pieces of information necessary for the user to receive the service. For example, the detailed preference of the user is grasped by providing the word-of-mouth information, and a service for introducing the gourmet information based on the detailed preference is received.

The service level is determined by the provider that provides the service, and is transmitted from the data use device 20N to the data intermediary device 100 along with the terms of service of the service. The service levels are also disclosed at a time of requesting a consent of the user.

FIG. 11 is an explanatory diagram showing an example of a consent request screen that employs the service levels and is displayed by the data intermediary device 100 according to the second embodiment of the invention.

In the consent request screen of the second embodiment, as shown in FIG. 11, the service levels are also displayed in addition to the service name, the data items, and the like similar to those in the first embodiment. The example of FIG. 11 shows the consent request screen when the user intends to use the gourmet inquiry service and consents to provide the name, the mail address, and the visit history information. This screen shows that the service level "Standard" is provided based on a current consent content. The consent request screen may further include information indicating a service content of each level and data items that need to be provided for receiving the service of each level.

According to the present embodiment, the service provider can incorporate many users by providing the service in accordance with the privacy preference of the users. The user can also freely select the service while protecting the privacy. For example, at first, only minimum data is provided, and the service content is confirmed. When the user can confirm a value of the service, the service can be received in a stepwise manner by increasing data to be provided and raising the service level that can be received.

The system according to the embodiment of the invention may be configured as follows.

(1) A data intermediary system includes a processor (for example, the CPU 3000) and a storage unit (for example, at least one of the memory 4000 and the storage unit 2000). The storage unit is configured to store, for a plurality of services used by a user in the past, provision situation information (for example, the data provision situation table 700) indicating a provision situation of data for each item of the data provided to a provider that provides the service in order to use the service for the user. The processor is configured to acquire information indicating an item of data requested, by the provider that provides a service requested to be used by the user, to be provided by the user (for example, step S103), acquire the provision situation of data of the same item as the item of the data requested, by the provider that provides the requested service, to be provided by the user (for example, steps S304 to S305), determine that an item of the data whose provision situation satisfies a predetermined condition is provided to the provider that provides the requested service (for example, step S306: Yes), and control distribution of the data to the provider that provides the requested service from a provider that holds the data of the item determined to be provided (for example, steps S110 to S114).

As a result, it is possible to extract the provision situation of personal data of the user that is a data owner, and to grasp privacy preference of the user such as which data is provided and which data is not provided by each user.

(2) In the above (1), the provision situation information includes a provision rate (for example, the provision rate 707) for each item of the data, which is a ratio of the number of services for which the item of the data is provided by the user with respect to the number of services for which the item of the data is requested. The predetermined condition is that the provision rate exceeds a predetermined reference value.

As a result, it is possible to accurately grasp the privacy preference of the user.

(3) In the above (2), the provision situation information includes the provision rate for each set of the item of the data and at least one of a use purpose of the data (for example, the use purpose 703), a use condition of the data (for example, the use condition 704), a storage period of the data (for example, the storage period 705), and an involvement condition of the user on the data (for example, the involvement condition 706). The information indicating the item of the data requested to be provided by the user to the provider that provides the requested service is included in terms of service of the requested service. The terms of service of the requested service include information indicating at least one of the use purpose of the data, the use condition of the data, the storage period of the data, and the involvement condition of the user on the data, corresponding to the item of the data. The processor is configured to compare the provision rate that is from the provision state information and corresponds to the set of the item of the data and at least one of the use purpose of the data, the use condition of the data, the storage period of the data, and the involvement condition of the user on the data included in the terms of service of the requested service with the predetermined reference value.

As a result, it is possible to accurately grasp the privacy preference of the user.

(4) In the above (1), the information indicating the item of the data requested to be provided by the user to the provider that provides the requested service is included in terms of service of the requested service. The processor is configured to output information indicating that the terms of service of the service are corrected so as not to provide an item of the data determined not to be provided to the provider that provides the requested service (for example, step S107).

As a result, the terms of service of the service can be created in accordance with individual users. The user can grasp that the preference of the user himself/herself is reflected in the disclosed terms of service of the service, and can quickly determine whether to consent, thereby increasing a consent rate.

(5) In the above (4), when the processor acquires information indicating consent to the correction of the terms of service of the service, the processor is configured to acquire, based on the corrected terms of service, the data from the provider that holds the data of the item determined to be provided to the provider that provides the requested service, and control distribution of the data by transmitting the acquired data to the provider that provides the requested service (for example, steps S110 to S114).

As a result, it is possible to control the distribution of the data of the users among the providers based on the terms of service of the service created in accordance with the individual users.

(6) In the above (1), the storage unit is configured to further store service level information (for example, the service level information 1000) for associating the item of the data provided to the provider that provides the service requested by the user and a level of the requested service provided to the user. The processor is configured to output, based on the service level information, the level of the service corresponding to the item of the data determined to be provided to the provider that provides the requested service (for example, step S408).

As a result, the service provider can incorporate many users by providing the service in accordance with the privacy preference of the users. The user can also freely select the service while protecting the privacy.

(7) In the above (6), in the service level information, items of the data and the level of the requested service are associated with each other such that the requested service of a higher level is provided to the user that provides more items of the data.

As a result, for example, at first, only minimum data is provided, and the service content is confirmed. When the user can confirm a value of the service, the service can be received in a stepwise manner by increasing the provided data and raising the service level that can be received.

The invention is not limited to the embodiments described above, and includes various modifications. For example, the above embodiment has been described in detail for better understanding of the invention, and is not necessarily limited to those including all the configurations described above. A part of the configuration of one embodiment can be replaced with the configuration of another embodiment, and the configuration of another embodiment can be added to the configuration of one embodiment. A part of the configuration of each embodiment may be subjected to addition, deletion and replacement of another configuration.

A part or all of the above configurations, functions, processing units, processing methods, and the like may be implemented by hardware, for example, by designing an integrated circuit. In addition, each of the above configurations, functions, and the like may be implemented by software by a processor interpreting and executing a program for implementing each function. Information such as a program, a table, or a file for implementing the functions can be stored in a storage device such as a non-volatile semiconductor memory, a hard disk drive, and a solid state drive (SSD), or a computer readable non-transitory data storage medium such as an IC card, an SD card, and a DVD.

Further, control lines and information lines show those considered to be necessary for description, and not all of the control lines and the information lines are necessarily shown in a product. Actually, it may be considered that almost all the configurations are connected to each other.

What is claimed is:

1. A data intermediary system comprising:
a processor; and
a storage unit configured to store, for a plurality of services used by a user in the past, provision situation information indicating a provision situation of data for each item of the data provided to a provider that provides the service in order to use the service for the user, wherein
the processor is configured to
acquire information indicating an item of data requested, by the provider that provides a service requested to be used by the user, to be provided by the user,
acquire the provision situation of data of the same item as the item of the data requested, by the provider that provides the requested service, to be provided by the user,
determine that an item of the data whose provision situation satisfies a predetermined condition is provided to the provider that provides the requested service, and
control distribution of the data to the provider that provides the requested service from a provider that holds the data of the item determined to be provided,
the provision situation information includes a provision rate for each item of the data, which is a ratio of the number of services for which the item of the data is provided by the user with respect to the number of services for which the item of the data is requested,
the predetermined condition is that the provision rate exceeds a predetermined reference value,
the provision situation information includes the provision rate for each set of the item of the data and at least one of a use purpose of the data, a use condition of the data, a storage period of the data, and an involvement condition of the user on the data,
the information indicating the item of the data requested to be provided by the user to the provider that provides the requested service is included in terms of service of the requested service,
the terms of service of the requested service include information indicating at least one of the use purpose of the data, the use condition of the data, the storage period of the data, and the involvement condition of the user on the data, corresponding to the item of the data, and the processor is configured to compare the provision rate that is from the provision state information and corresponds to the set of the item of the data and at least one of the use purpose of the data, the use condition of the data, the storage period of the data, and the involvement condition of the user on the data included in the terms of service of the requested service with the predetermined reference value.

2. The data intermediary system according to claim 1, wherein the processor is configured to output information indicating that the terms of service of the service are corrected so as not to provide an item of the data determined not to be provided to the provider that provides the requested service.

3. The data intermediary system according to claim 2, wherein when the processor acquires information indicating consent to the correction of the terms of service of the service, the processor is configured to acquire, based on the corrected terms of service, the data from the provider that holds the data of the item determined to be provided to the provider that provides the requested service, and control distribution of the data by transmitting the acquired data to the provider that provides the requested service.

4. The data intermediary system according to claim 1, wherein the storage unit is configured to further store service level information for associating the item of the data provided to the provider that provides the service requested by the user and a level of the requested service provided to the user, and the processor is configured to output, based on the service level information, the level of the service corresponding to the item of the data determined to be provided to the provider that provides the requested service.

5. The data intermediary system according to claim 4, wherein in the service level information, items of the data and the level of the requested service are associated with each other such that the requested service of a higher level is provided to the user that provides more items of the data.

6. A data intermediary method executed by a data intermediary system including a processor and a storage unit configured to store, for a plurality of services used by a user in the past, provision situation information indicating a provision situation of data for each item of the data provided to a provider that provides the service in order to use the service for the user, and the data intermediary method comprises:

a first step of acquiring, by the processor, information indicating an item of data requested, by the provider that provides a service requested to be used by the user, to be provided by the user;

a second step of acquiring, by the processor, the provision situation of data of the same item as the item of the data requested, by the provider that provides the requested service, to be provided by the user;

a third step of determining, by the processor, that an item of the data whose provision situation satisfies a predetermined condition is provided to the provider that provides the requested service; and a fourth step of controlling, by the processor, distribution of the data to the provider that provides the requested service from a provider that holds the data of the item determined to be provided, wherein the provision situation information includes a provision rate for each item of the data, which is a ratio of the number of services for which the item of the data is provided by the user with respect to the number of services for which the item of the data is requested, the predetermined condition is that the provision rate exceeds a predetermined reference value, the provision situation information includes the provision rate for each set of the item of the data and at least one of a use purpose of the data, a use condition of the data, a storage period of the data, and an involvement condition of the user on the data, the information indicating the item of the data requested, by the provider that provides the requested service, to be provided by the user is included in terms of service of the requested service, the terms of service of the requested service include information indicating at least one of the use purpose of the data, the use condition of the data, the storage period of the data, and the involvement condition of the user on the data, corresponding to the item of the data, and in the third step, the processor compares the provision rate that is from the provision state information and corresponds to the set of the item of the data and at least one of the use purpose of the data, the use condition of the data, the storage period of the data, and the involvement condition of the user on the data included in the terms of service of the requested service with the predetermined reference value.

7. The data intermediary method according to claim 6, wherein the data intermediary method further comprises a fifth step of outputting, by the processor, information indicating that the terms of service of the service are corrected so as not to provide an item of the data determined not to be provided to the provider that provides the requested service.

8. The data intermediary method according to claim 7, wherein when information indicating consent to the correction of the terms of service of the service is acquired, in the fourth step, the processor acquires, based on the corrected terms of service, the data from the provider that holds the data of the item determined to be provided to the provider that provides the requested service, and control distribution of the data by transmitting the acquired data to the provider that provides the requested service.

9. The data intermediary method according to claim 6, wherein the storage unit is configured to further store service level information for associating the item of the data provided to the provider that provides the service requested by the user and a level of the requested service provided to the user, and the data intermediary method further comprises a sixth step of outputting, by the processor, the level of the service corresponding to the item of the data determined to be provided to the provider that provides the requested service, based on the service level information.

10. The data intermediary method according to claim 9, wherein in the service level information, items of the data and the level of the requested service are associated with each other such that the requested service of a higher level is provided to the user that provides more items of the data.

\* \* \* \* \*